United States Patent
Angelini, II et al.

(10) Patent No.: US 10,204,103 B2
(45) Date of Patent: Feb. 12, 2019

(54) DIGITAL ASSET DOCK (DAD)

(71) Applicant: Fox Digital Enterprises, Inc., Los Angeles, CA (US)

(72) Inventors: John J. Angelini, II, Redondo Beach, CA (US); Elsa Fiorella Gardella, Alhambra, CA (US); Juliano Zucchetto Teixeira, Culver City, CA (US); David R. Trujillo, Palos Verdes Estates, CA (US); Gitte Dahl, Culver City, CA (US); Marc Henri Paul, Los Angeles, CA (US); Peter D. Bakalov, Santa Monica, CA (US); Winston Cheun Wan, Los Angeles, CA (US); Patrick H. Tran, Los Angeles, CA (US); Mangesh Pimpalkar, Los Angeles, CA (US)

(73) Assignee: FOX DIGITAL ENTERPRISES, INC., Los Angeles, CA (US)

( * ) Notice: Subject to any disclaimer, the term of this patent is extended or adjusted under 35 U.S.C. 154(b) by 481 days.

(21) Appl. No.: 14/812,813

(22) Filed: Jul. 29, 2015

(65) Prior Publication Data
US 2016/0034451 A1    Feb. 4, 2016

Related U.S. Application Data

(60) Provisional application No. 62/030,503, filed on Jul. 29, 2014.

(51) Int. Cl.
G06F 17/30 (2006.01)

(52) U.S. Cl.
CPC .................. *G06F 17/3002* (2013.01)

(58) Field of Classification Search
CPC ............... G06F 17/3002; G06F 17/30023
See application file for complete search history.

(56) References Cited

U.S. PATENT DOCUMENTS

| | | | | |
|---|---|---|---|---|
| 2008/0168494 A1* | 7/2008 | Ruohomaki | ........... | G06Q 10/06 725/38 |
| 2011/0191397 A1* | 8/2011 | Dazzi | ............ | G06F 17/30 707/827 |
| 2011/0314378 A1* | 12/2011 | Nijim | ............ | G06F 17/3089 715/716 |
| 2012/0117120 A1* | 5/2012 | Jacobson | .......... | G06F 17/30557 707/793 |
| 2016/0020830 A1* | 1/2016 | Bell | ............ | H04B 5/0037 307/104 |

\* cited by examiner

*Primary Examiner* — Loc Tran
(74) *Attorney, Agent, or Firm* — Gates & Cooper LLP

(57) ABSTRACT

A method, system, apparatus, article of manufacture, and computer program product provide the ability to ingest a media content file. The media content file to be uploaded and managed in an enterprise media framework (EMF) is selected. Media content file(s) to be tagged are also selected. A mask matcher identifies a mask (having multiple parts) that identifies a file structure of information associated with the media content file. For each of the multiple parts and based on the information associated with the media content file, metadata is calculated and applied to the media content file.

18 Claims, 13 Drawing Sheets

FIG. 7B

| Part — 716 | Processor — 704 | Action — 706 | 718 — Info |
|---|---|---|---|
| 0. Broadcast Specification | Pass Matchlist | Pass Broadcast Specifications | Info |
| 1. WPR Number | Pass WPR# | Pass Title | Info |
| | | Pass WPR Id | |
| | | Pass Asset Type | |
| 2. Master Control Number (MCN) or Version number | Pass Version Id | Pass Version Id | Info |
| | | Pass WPR Id | |
| | | Pass Title | |
| | | Pass Asset Type | |
| 3. Audio Language | Pass Audio | Pass Conformed L | Results |
| | | Pass Audio Chann | Conformed Language : LAS |
| | | Pass Audio Chann | Audio Channel 1 Language : LAS |
| | | Pass Audio Chann | Audio Channel 2 Language : LAS |
| | | | Audio Channel Preset : Audio – Scenario 4 |
| 4. Description | Pass BQ Video Description | N/A No significan | |
| 5. TRT (Total Runtime) | Pass Runtime | Pass Total Runtime | Info |
| 6. DAR (Display aspect ratio) | Pass Display Aspect Ratio (DAR) | Pass Video Aspect Ratio | Info |
| | | Pass Aperture | |
| 7. Source | Pass Matchlist | Pass Master Version: Overrode existing value | |
| 8. Show Title | Pass Ignore | N/A | |
| 9. Set Number | Pass Ignore | N/A | |

FIG. 7C

Template: TVD BQ Video

Title

*Title[132049]
HOW TO TRAIN YOUR DRAGON 2

EPISODE | *VERSION ID | SEASON
--- | --- | ---
 | 291257 -- NOT VERSION SPECIFIC |

Asset Information

ESPIRIT ID | *DIVISION | *FOX DEPARTMENT | *ASSET TYPE | *FOX TERRITORY | VENDOR WORK ORDER
--- | --- | --- | --- | --- | ---
 | TV Distribution | Servicing | Feature | Intl -- Home Office | 
*CANVAS WIDTH | *CANVAS HEIGHT | *PROFILE TYPE | *CONFORMED LANGUAGE | *TEXTED LANGUAGE | SUBTITLE LANGUAGE
1920 | 1080 | Broadcast | Spanish -- Latin American (LAS) | |

NOTES\COMMENTS

Video Details

*FRAME RATE (FPS) | RUNTIME TOTAL | *RESOLUTION | *CODEC | *AUDIO: BIT DEPTH | *VIDEO ASPECT RATIO | *APERTURE
--- | --- | --- | --- | --- | --- | ---
25 | 00:03:11 | 1080i | MPEG-2 | 24 bit | 2:40:1 | Letterbox
*CANVAS ASPECT RATIO | *VIDEO BIT RATE | *AUDIO CODEC | VERIFICATION CHECKSUM | CLOSED CAPTION | *MASTER VERSION | TRAILER VERSION
16x9 | 50 | PCM | | | VAM |

VIDEO NOTES

FIG. 8

| Audio Channel 01 | | | | |
|---|---|---|---|---|
| CONFIG-CH01 | LANG-CH01 | FORMAT-CH01 | USAGE-CH01 | DYNAMIC RANGE-CH01 |
|  | Spanish -- Latin American (LAS) | Mono | Narration | Broadcast |

| Audio Channel 02 | | | | |
|---|---|---|---|---|
| CONFIG-CH02 | LANG-CH02 | FORMAT-CH02 | USAGE-CH02 | DYNAMIC RANGE-CH02 |
|  | Spanish -- Latin American (LAS) | Mono | Dialogue | Broadcast |

| Audio Channel 03 | | | | |
|---|---|---|---|---|
| CONFIG-CH03 | LANG-CH03 | FORMAT-CH03 | USAGE-CH03 | DYNAMIC RANGE-CH03 |
| Left |  | 2 track | Music & Effects | Broadcast |

| Audio Channel 04 | | | | |
|---|---|---|---|---|
| CONFIG-CH04 | LANG-CH04 | FORMAT-CH04 | USAGE-CH04 | DYNAMIC RANGE-CH04 |
| Right |  | 2 track | Music & Effects | Broadcast |

| Audio Channel 05 | | | | |
|---|---|---|---|---|
| CONFIG-CH05 | LANG-CH05 | FORMAT-CH05 | USAGE-CH05 | DYNAMIC RANGE-CH05 |
|  | MOS (no audio) (MOS) |  |  | Broadcast |

| Audio Channel 06 | | | | |
|---|---|---|---|---|
| CONFIG-CH06 | LANG-CH06 | FORMAT-CH06 | USAGE-CH06 | DYNAMIC RANGE-CH06 |
|  |  | Mono | Time Code | Broadcast |

| Audio Channel 07 | | | | |
|---|---|---|---|---|
| CONFIG-CH07 | LANG-CH07 | FORMAT-CH07 | USAGE-CH07 | DYNAMIC RANGE-CH07 |
|  | MOS (no audio) (MOS) |  |  | Broadcast |

| Audio Channel 08 | | | | |
|---|---|---|---|---|
| CONFIG-CH08 | LANG-CH08 | FORMAT-CH08 | USAGE-CH08 | DYNAMIC RANGE-CH08 |
|  | MOS (no audio) (MOS) |  |  | Broadcast |

FIG. 9

DIGITAL ASSET DOCK (DAD)

CROSS-REFERENCE TO RELATED APPLICATIONS

This application claims the benefit under 35 U.S.C. Section 119(e) of the following co-pending and commonly-assigned U.S. provisional patent application(s), which is/are incorporated by reference herein:

Provisional Application Ser. No. 62/030,503, filed on Jul. 29, 2014, by John J. Angelini II et. al., entitled "Digital Asset Dock (DAD)."

This application is related to the following co-pending and commonly-assigned patent application, which application is incorporated by reference herein:

U.S. patent application Ser. No. 14/742,568, filed on Jun. 17, 2015, entitled "Online Global Planning System for International Theater Post Production and Enterprise Operations", by Garrett Vincent-McKay Boss et. al., which application claims priority to U.S. Patent Application Ser. No. 62/013,470, filed on Jun. 17, 2014 entitled "Online Global Planning System for International Theater Post Production and Enterprise Operations", by Garrett Vincent-McKay Boss et. al.; and U.S. Patent Application Ser. No. 62/174,328, filed on Jun. 11, 2015 entitled "Global Online Digital Asset Management (DAM)", by Garrett Vincent-McKay Boss et. al.

BACKGROUND OF THE INVENTION

1. Field of the Invention

The present invention relates generally to managing media content, and in particular, to a method, apparatus, system, computer program product, and article of manufacture for tagging a digital media content asset.

2. Description of the Related Art

Digital media content assets (aka an asset and/or media content) have become more and more ubiquitous as the television and film industry has transitioned from physical film media to digital management, storage, and transmission (e.g., across the Internet and/or other internal networks). The problem that has arisen is how to accurately, efficiently, and quickly identify and tag ingested assets so that they may be managed, searched, edited, transmitted, etc. Prior art systems have failed to provide such capabilities.

SUMMARY OF THE INVENTION

Embodiments of the invention provide a method, apparatus, system, article of manufacture, and computer program product for assigning metadata tags to a media content asset. Features associated with such metadata tagging include:

- global preset functionality tying metadata tagging rules to an asset (i.e., customizable and user specific templates that maintain preconfigured metadata tags that are used to tag an asset with ability to mandate more required fields and/or lock fields to drive more accurate metadata tagging);
- upload functionality including upload security policy, template, and division selection, and dynamic/live early metadata tagging that may be initialized prior to completion of an asset upload; and
- automatic tagging of metadata assets.

BRIEF DESCRIPTION OF THE DRAWINGS

Referring now to the drawings in which like reference numbers represent corresponding parts throughout:

FIG. 7B illustrates a summary of the auto-tagging feature workflow in accordance with one or more embodiments of the invention;

FIG. 7C illustrates the different parts of the filename, processors, and actions performed in accordance with one or more embodiments of the invention;

FIGS. 8 and 9 illustrate a close up view of the results of auto tagging performed on the filename in FIG. 7 in accordance with one or more embodiments of the invention;

DETAILED DESCRIPTION OF THE PREFERRED EMBODIMENTS

Figure 1:
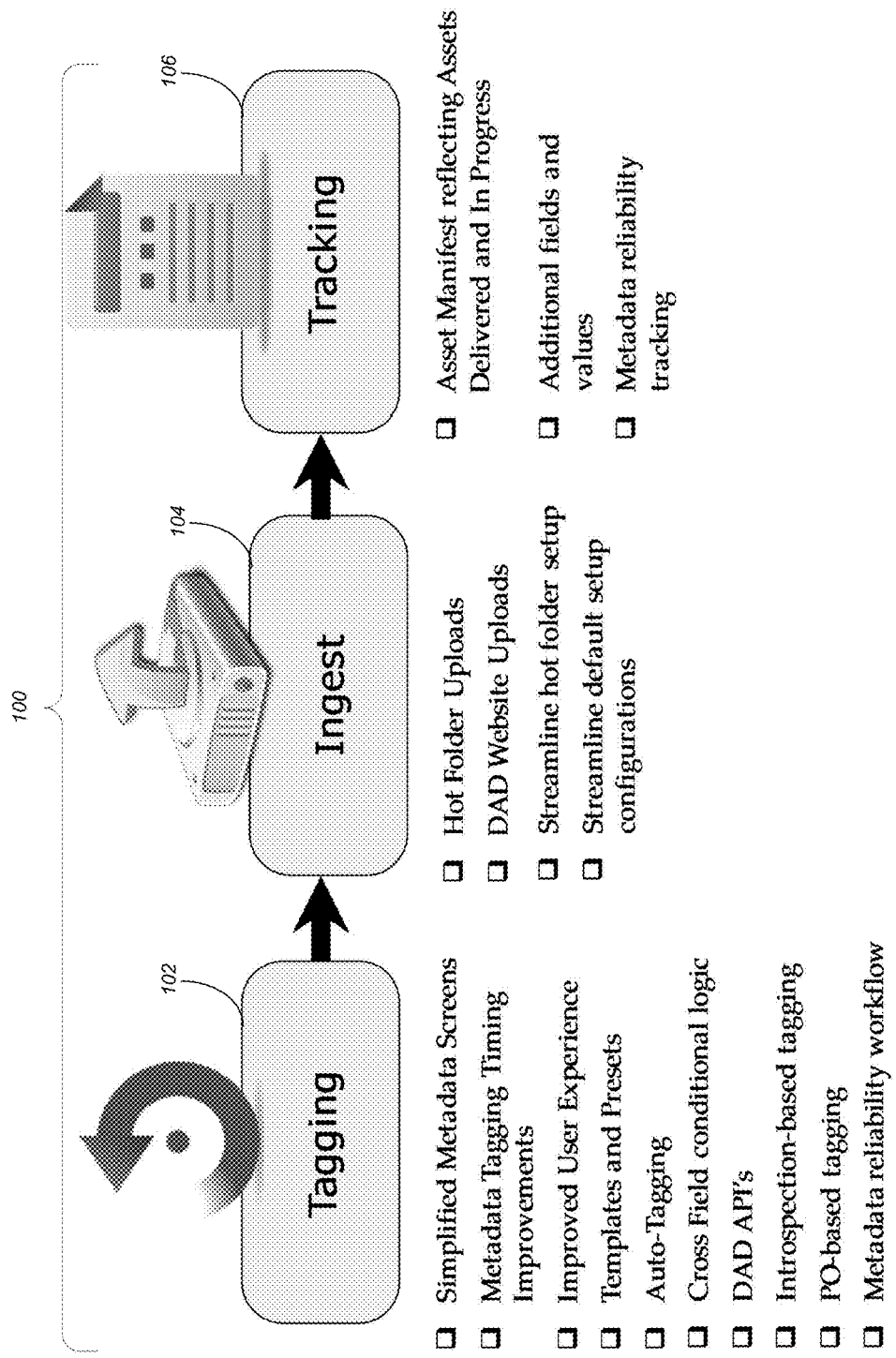
FIG. 1 illustrates the summary of the features provided by DAD 100 in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

System Level Overview

An Enterprise Media Framework (EMF) provides a system for managing a large volume of media content (e.g., for a studio or other media provider). In particular, the EMF may provide one or more of the following capabilities/features with respect to media content:

a centralized Digital Asset Management (DAM) and repository (in a system referred to as "Esprit");
Search;
Preview;
Download;
Ingest;
Accelerated File Transfer;
Digital Screeners (films/tv);
Broadcast Qualify File Delivery (self-service and push);
Annotation/Markup (time-based and non-time based);
Watermark, Digital Rights Management (DRM), etc.

As used herein, the terms media content, media content asset, asset, and content refers to any type of digital media content used for television, film, marketing, etc. Many types and pieces of information or media content may be utilized as part of the broadcast, advertisement, and sale of such content. Content from various studios (e.g., FOX™) may include:

Over 2,500 Feature Films; over 14,000 Television Series, Seasons and Episodes; and over 1,000 Specials, Movies of the Week and MiniSeries;
Over 100,000 images: Production Stills, Logos, Artwork, Gallery and Episodic Photos;
Over 12,000 Scripts and over 10,000 Music Cue Sheets;
Over 7,300 trailers and other promotional videos;
Over 2,500 episodes for screening;
Over 9,300 broadcast quality files, representing over 700 episodes; and
Over 1,000 broadcast quality promotional videos (Television spots, etc.).

Exemplary formats in which an asset may be created/stored includes MPEG2 (motion pictures expert group version 2), MPEG4, NTSC (national television system committee) 4×3 aspect ratio, 30 fps (frames per second), PAL (phase alternating line) 16×9 aspect ratio at 25 fps, etc. Content may also include television broadcast quality assets, J2K (JPEG 2000) files, etc. Additional assets may include DCP (Digital Cinema Projection) files (i.e., theatrical feature or trailer playouts), DCDM (Digital Cinema Distribution master) files (i.e., post production assets prior to DCP—useful for archiving and may be used for international re-versioning purposes), DSM (Digital Source Master) files (i.e., the original film supplied to an encoding facility), MXF (material eXchange Format), etc. In this regard, media content assets refer to any type of digital representation of media content and/or marketing content for such an asset.

Digital Asset Dock Overview

Within an EMF, a system is needed during the ingestion stage for tagging assets. Prior art systems relating to the tagging of assets were deficient in many respects. The deficiencies, and ability to overcome such deficiencies may include:

Inaccurate tagging of assets (assets were incorrectly tagged within a media repository)
  SOLUTION: Tag from automated sources (e.g., a PO [Purchase Order])
Metadata tagging takes too long;
  SOLUTION: Tag upon upload;
Finding incorrectly tagged assets;
  SOLUTION: Reduce mis-tagged asset issues;
Rapid transition from physical to digital;
  SOLUTION: Foundation for digital delivery (e.g., to FOX™);
User Experience;
  SOLUTION: Easy and customized to use cases; and
FMS (Fox Media Services™) backlog;
  SOLUTION: Direct vendor uploads Embodiments of the invention provide the above-described solutions via a digital asset dock (DAD). DAD is a media repository (e.g., Esprit) portal that streamlines vendor and partner delivery of digital assets into the EMF by giving uploading users a method to easily upload and metadata tag assets. In addition to providing the above solutions, DAD may provide one or more of the following benefits:

Reduced costs by eliminating physical media workflows;
  If an asset can't be found, it must be recreated/reproduced. In an easy use case, a user may request an asset from a vendor and pay for delivery. However, if the vendor doesn't have it or can't find it, the asset may need to be recreated from scratch at a higher cost.
Increased supply chain velocity by receiving content earlier from suppliers;
Increased scale for future growth of digital media delivery; and
Increased processing efficiency as assets are received with the correct data from suppliers, thus helping reduce unnecessary reproduction of assets.

FIG. 1 illustrates the summary of the features provided by DAD 100 in accordance with one or more embodiments of the invention. DAD's processing workflow provides for tagging 102, ingesting 104, and tracking 106 assets.

In the tagging phase 102, DAD 100 provides simplified metadata screens, metadata tagging timing improvements, improved user experience, templates and presets (including global presets), auto-tagging (ability to parse a filename based on its structure, execute appropriate processes, and automatically tag an asset), cross field conditional logic, APIs (Application Programming Interfaces), and a metadata reliability workflow.

During the ingestion phase 104, DAD 100 provides for hot folder uploads, website uploads, streamlined hot folder setup, and streamlined default setup configurations. As illustrated, the tagging phase 102 may be performed prior to and/or during the ingestion phase 104. In this regard, dynamic/live tagging is permitted while an asset is ingested/uploaded. For example, within a short time period of a file arriving in a hot folder/site, a process picks up the filename, creates an asset in the media repository, and the user can immediately see the asset in DAD 100 to begin tagging. Consequently, there is no need to wait for the entire asset to be uploaded prior to beginning the tagging process.

During the tracking phase 106, DAD 100 provides for an asset manifest reflecting assets delivered and in progress, additional fields and values, and metadata reliability tracking.

The various phases 102-106 of DAD 100 (and the existence of DAD 100) may be transparent to other systems/components of EMF. In this regard, the media repository and asset delivery mechanisms may not be aware of the features or existence of DAD 100.

Figure 2:
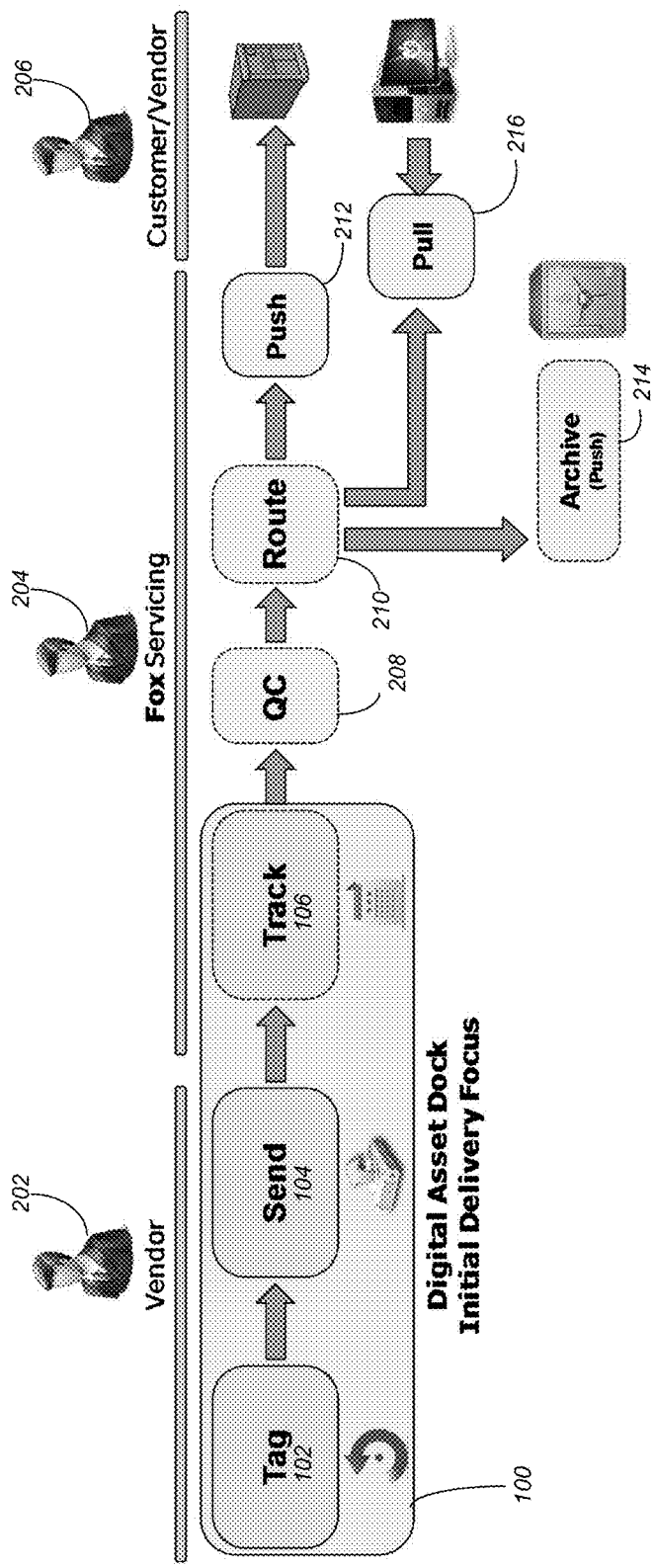
FIG. 2 illustrates the digital supply chain overview utilized in accordance with one or more embodiments of the invention.

FIG. 2 illustrates the digital supply chain overview utilized in accordance with one or more embodiments of the invention. DAD 100 provides the focus of the initial delivery into the digital supply chain. The vendors 202 tag 102 and send 104 assets to the servicing group 204 (e.g., Fox™ Servicing). While with the servicing group 204, the assets are still tracked 106 within DAD 100. The servicing group 204 performs quality control 208 and routes 210 the items/asset for delivery (e.g., via a delivery service such as FoxFast™) via a push 212 (that may include archiving 214) or pull 216 to a customer/vendor 206.

As described herein, DAD 100 provides various unique capabilities including templates, global presets, web uploads with upload security policy, early/live metadata tagging, and auto-tagging functionality.

Templates and Global Presets

Figure 3:
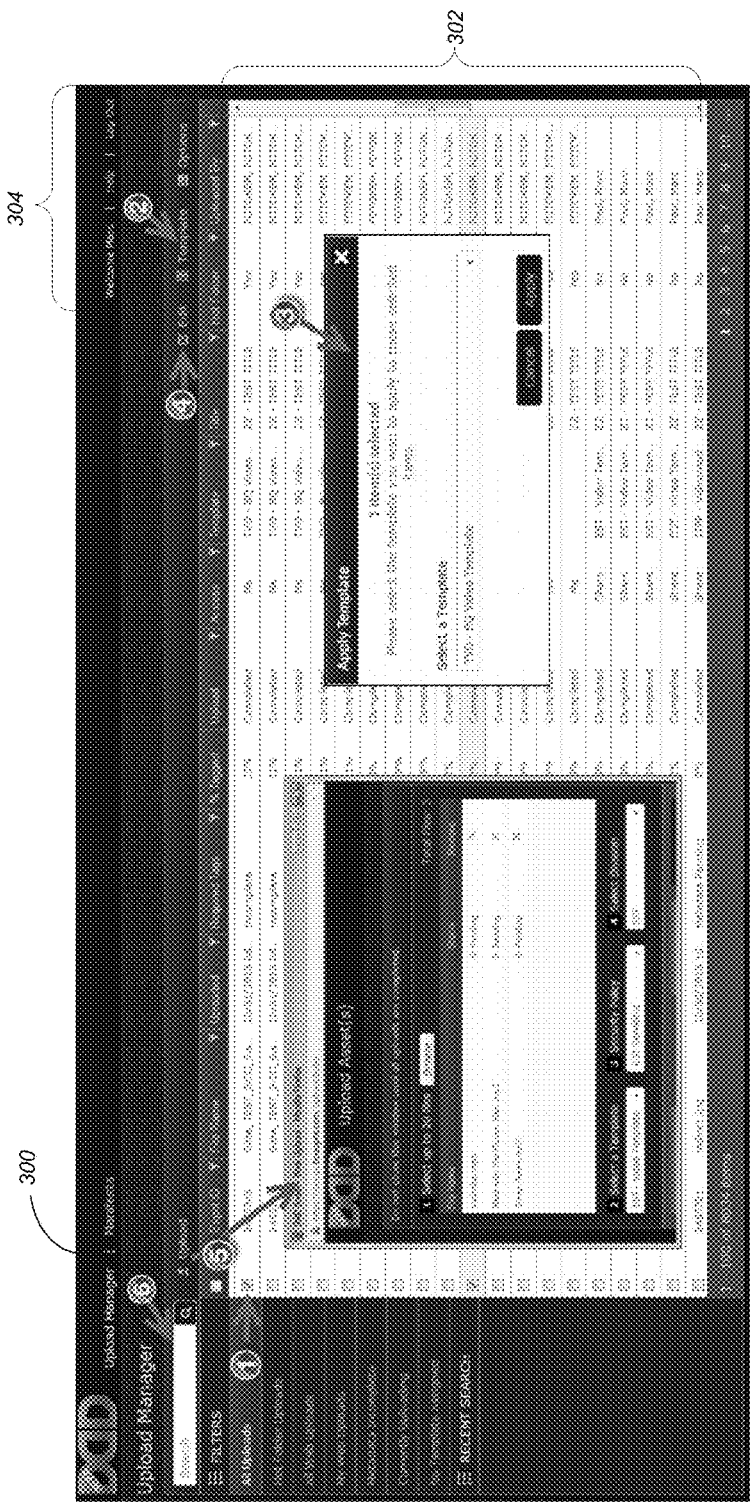
FIG. 3 illustrates the graphical user interface of an exemplary upload manager in accordance with one or more embodiments of the invention.

When a user logs in to DAD 100, the homepage may be an upload manager that displays all of the available assets for a specific user. FIG. 3 illustrates the graphical user interface of an exemplary upload manager in accordance with one or more embodiments of the invention. To use the DAD upload manager 300, various steps may be performed.

Step 1 is that of selecting assets. The user can select one or multiple assets (i.e., bulk editing) via the check boxes to the left of the assets.

Step 2 is the template button. The template button may be clicked to assign a template. A template may be required to be assigned to any asset that is not already associated with a template.

Step 3 is the apply template pop-up. Once the user elects to assign a template at step 2, the pop-up template dialog window in step 3 may be displayed. The pop-up requires a template to be selected. The user can select a template using a drop down menu and elect to apply the template or cancel the template assign operation. Users may also filter the available templates by division and department.

Step 4 is the edit button. The user may click "Edit" to proceed to DAD's edit asset metadata page.

Step 5 is the web upload. The user clicks "upload" to browse and select asset(s) located on a local workstation for upload through the browser.

Step 6 is the search feature. A user may enter a keyword in the search field to quickly find/filter the assets against/ based upon specific DAD fields.

Accordingly, the user can search/view the assets available (which are displayed in area 302, select specific assets via checkboxes at step 1, apply templates via steps 2 and 3, edit metadata for the assets via edit step 4, and/or upload new assets to be ingested at step 5.

Details regarding the login process, the display of available assets, the upload manager, the search and filter capability, and upload process is described in further detail in Appendix A—User Reference Guide of provisional application 62/030,503, which is incorporated by reference herein. The upload manager (illustrated in FIG. 3) provides a view 302 of all of the assets the user has access to based on the permission of the user (e.g., the group the user is associated with/belongs to and the security policies they have been assigned in Esprit). In this regard, the user logs in and an indication of the login status may be displayed in area 304. Thereafter, the assets that are displayed in area 302 are limited to those assets that the logged in user has appropriate authorization/access permissions.

Via the upload manager, the user can begin the process of tagging assets with identifying information so that such assets can be located easily in the future. Any number of assets (e.g., more or less than 20 assets) can be simultaneously tagged. In this regard, FIG. 3 illustrates the selection of the assets to be tagged. The template provides the ability to tag particular fields of each asset based on preconfigured parameters. Thus, once assets have been selected (i.e., at step 1), the template to be associated with the selected assets is selected via steps 2 and 3. The user may also edit the selected assets metadata at step 4 and finally upload all of the assets based on the template and/or edited metadata at step 5. In addition, the search feature may be used to display the assets for selection/viewing/editing (at step 6).

Figure 4:
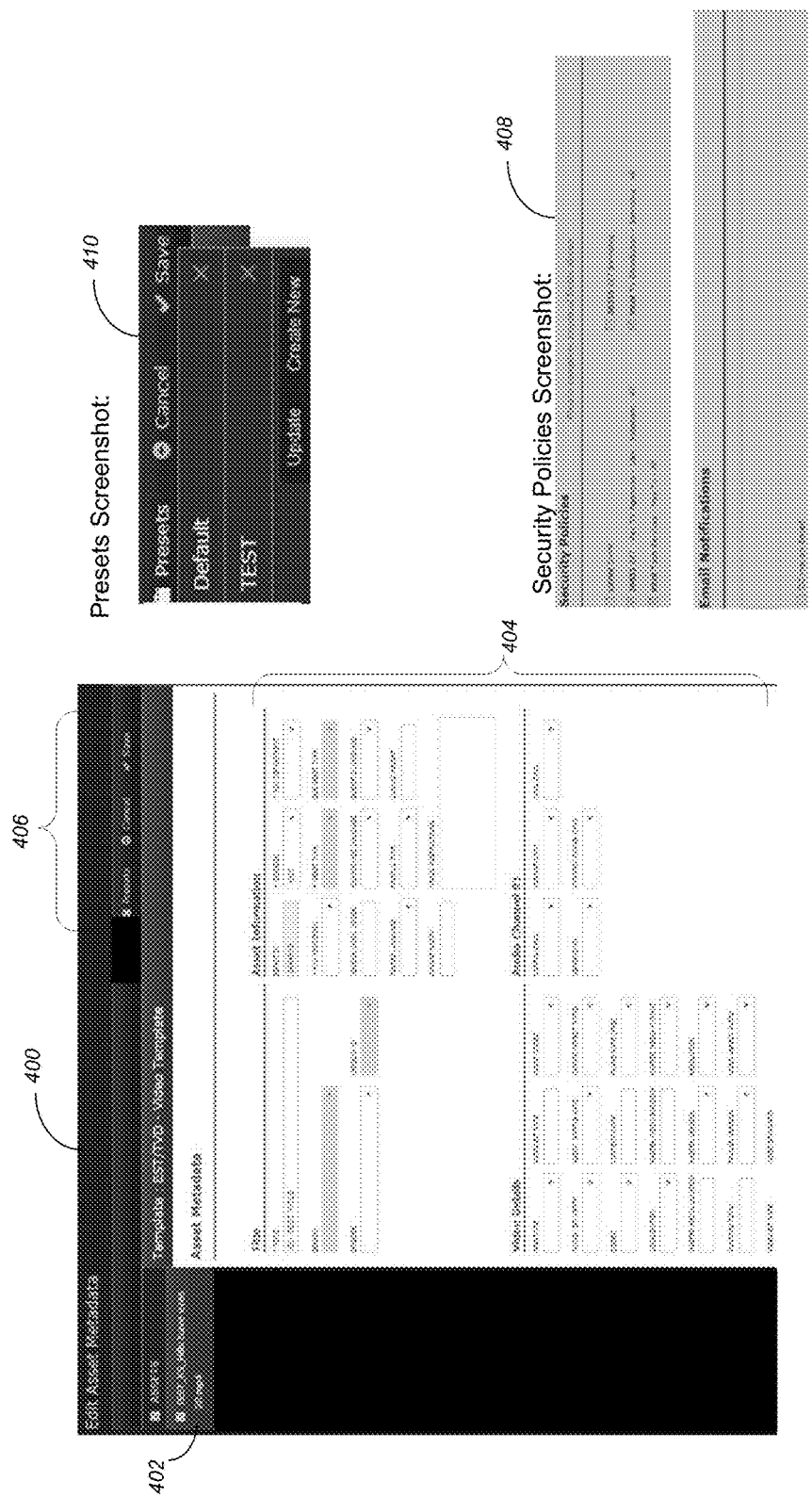
FIG. 4 illustrates the graphical user interface of an exemplary edit single asset metadata page in accordance with one or more embodiments of the invention.

When the user elects to edit the assets' metadata (i.e., step 4 of FIG. 3), various options may be presented to the user. FIG. 4 illustrates the graphical user interface of an exemplary edit single asset metadata page 400 in accordance with one or more embodiments of the invention. There are three (3) main elements on the edit asset metadata page 400.

Asset list 402—this lists all assets currently selected for editing (note: selecting multiple assets allows for bulk editing).

Metadata fields 404—this area shows all available metadata fields and security policies. Please note that metadata fields with an asterisk are required (i.e., users cannot save their edits when required fields are left blank).

Functional buttons 406—"Presets", "Cancel", and "Save" and "Save Next" (editing a single asset during a bulk edit) are this page's functional buttons. Note that "Presets" allows users to quickly assign common/bulk metadata to one or more asset(s). When finished with the metadata edits, users simply click save and are reverted back to the upload manager page of FIG. 3.

At the bottom of the metadata fields section 404, security policies may be available for selection (i.e., such as that displayed at 408). Greyed-out checkboxes that cannot be checked may be mandated policies.

The functional "preset" button (in area 406) allow users to quickly assign common/bulk metadata to one or more asset(s). Presets are either created and managed by the end-user (Personal Preset) or by an administrator (Global Preset) and assigned to a user by the group they belong to. When selecting the "Preset" button a user can either update an existing personal preset or create a new one (e.g., as illustrated at 410). The user can select a personal preset or Global Preset to apply values to one or more fields on one or more assets. Global Presets can also be set by administrators to lock fields to prevent changes to the field's values assigned by the preset for the asset(s) selected. Global Presets can also be set by administrators to require additional fields be completed when the preset is assigned to a(n) asset(s). Global Presets can be applied or removed to assets to enforce or remove the aforementioned rules to a(n) asset(s). When applying a Preset, the user must save their change to save the changes. More than one Preset can be applied to an asset. Such presets/templates can be assigned to specific user groups, may specify that certain fields are required/optional, etc.

Appendix D of provisional application 62/030,503, which is incorporated by reference herein, describes the enhancements for global presents in accordance with one or more embodiments of the invention.

Embodiments of the invention also provide the ability to allow for bulk-editing of assets. Bulk editing allows users to select multiple assets and adjust all of the selected assets' metadata through one workflow. Appendix A of provisional application 62/030,503 illustrates the graphical user interfaces and steps that may be utilized to perform bulk editing in accordance with one or more embodiments of the invention.

In addition to the above, Appendix C of provisional application 62/030,503, which is incorporated by reference herein, provides an Administrative Manual for managing templates in accordance with one or more embodiments of the invention.

Dynamic Asset Tagging During Upload

Figure 5:
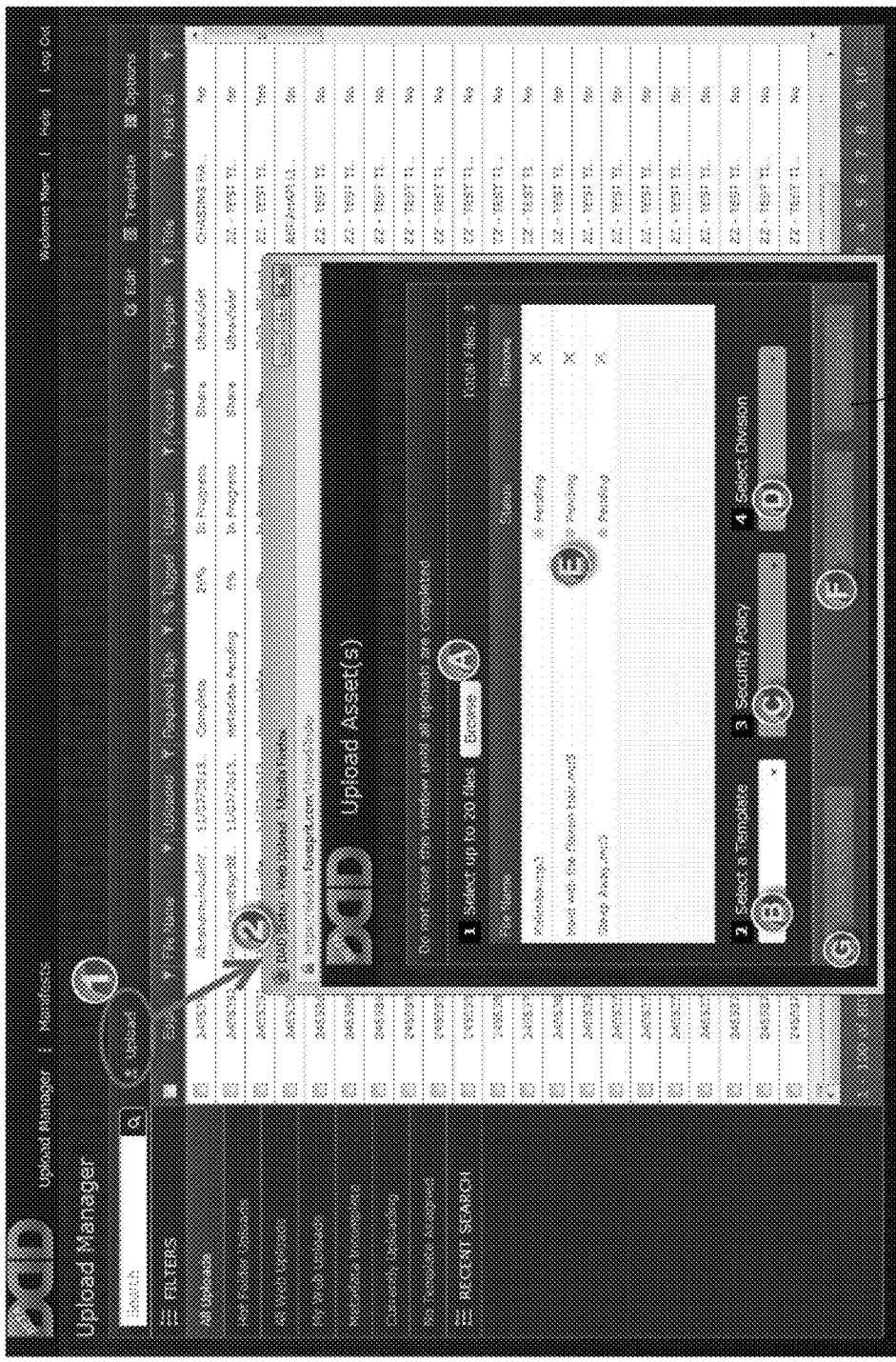
FIG. 5 illustrates a graphical user interface for uploading assets wherein once the upload process has initialized, metadata may be updated in accordance with one or more embodiments of the invention.

In addition to the above, embodiments of the invention provide the ability to perform dynamic/live tagging of an asset while an asset is being uploaded to a content repository. FIG. 5 illustrates a graphical user interface for uploading assets wherein once the upload process has initialized, metadata may be updated in accordance with one or more embodiments of the invention. In particular, as described above, once the asset(s) have been selected (at A) and the user identifies a template (B), security policy (C), and a division (D), the upload process may begin (i.e., by selecting the "start upload" button 502 (shown greyed out in FIG. 5 as the required fields B, C, and D have not been selected yet). Thereafter, once the upload process has been initialized (e.g., after about 10 seconds), the "Update Metadata" button (G) may illuminate allowing the user to tag the asset during the upload process.

Figure 6:
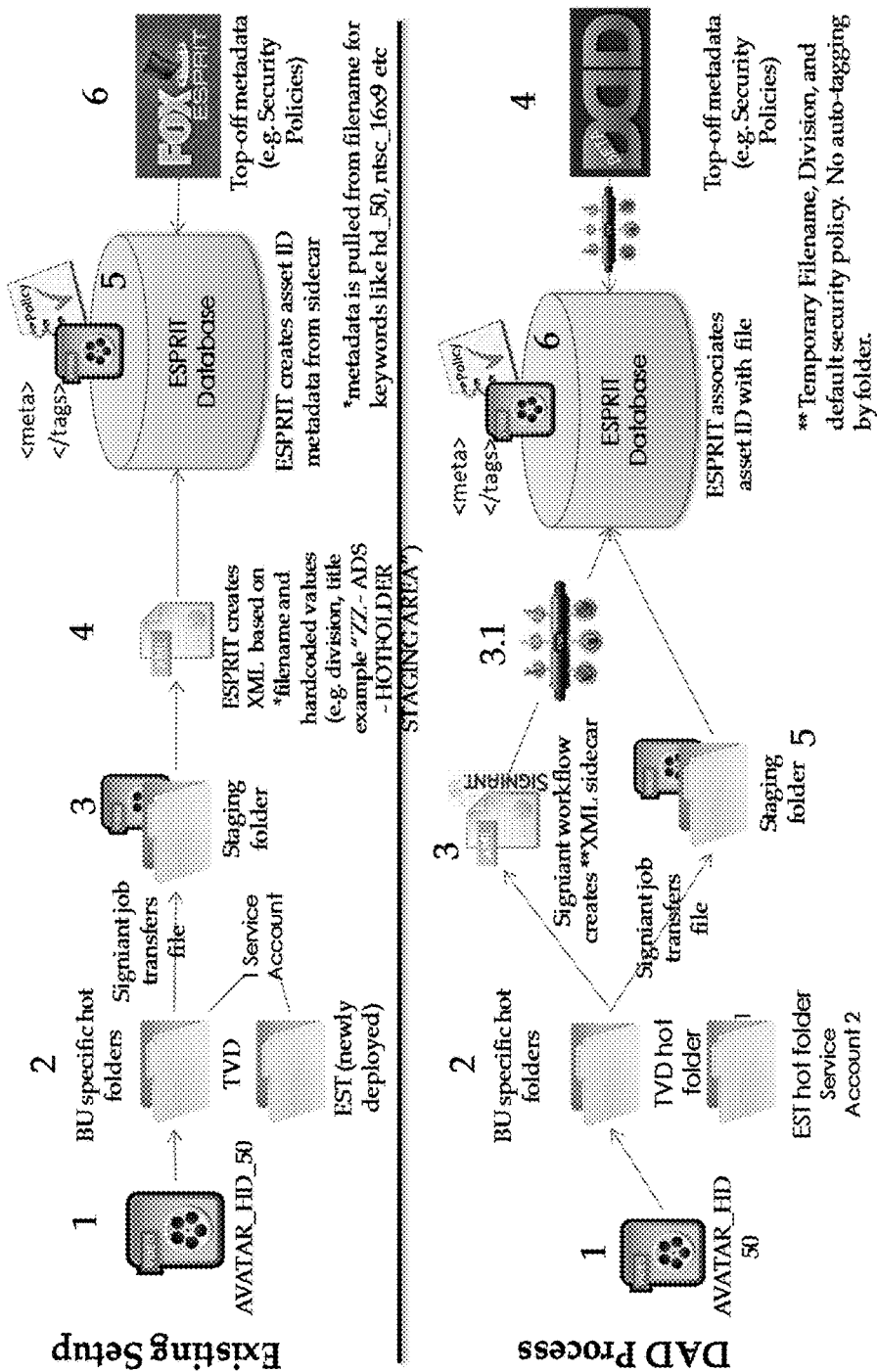
FIG. 6 illustrates a comparison of the prior art workflow for tagging assets versus the tagging workflow of embodiments of the present invention.

FIG. 6 illustrates a comparison of the prior art workflow for tagging assets versus the tagging workflow of embodiments of the present invention. In the prior art/existing configuration/workflow (upper half of FIG. 6), assets 1 are placed into "hot folders" 2. A Signiant™ job transfer process transfers the files into staging folders 3. An Esprit™ process creates XML 4 based on the filename and hardcoded values and then begins the upload process (of the asset and tags) into the Esprit™ database 5. Additional metadata 6 may then be added to the asset. As illustrated in the prior art/existing setup, each of the processes occurs in order 1-6.

In embodiments of the invention (the bottom half of FIG. 6) once the asset 1 is placed into hot folders 2, the process diverges from the prior art. The Signiant™ workflow process creates XML simultaneously with initializing the job transfer file into the staging folder 5. Once the upload process into the Esprit™ metadata repository/database 6 begins (but before it is complete), DAD 4 can begin providing/tagging the asset with additional metadata (e.g., based on an asset ID provided to DAD by Esprit). Accordingly, steps 3 and 3.1 allow the user to begin the tagging in step 4 before the database is completely uploaded at step 6. To begin tagging at step 4, DAD may utilize an early retrieval of the asset ID.

In addition to the above, folder and filename driven tagging may be removed to help templates drive metadata tagging.

Automatic Asset Tagging

As described above, it is desirable to tag a large asset with metadata. Embodiments of the invention process a file having a structured file name using a mask to identify different and individual parts of the filename, identify appropriate processors/process logic corresponding to each part of the file name, utilize the processor to call an action that applies data to the asset (e.g., tags the asset), and logs the various processes for reporting and notification.

Figure 7A:
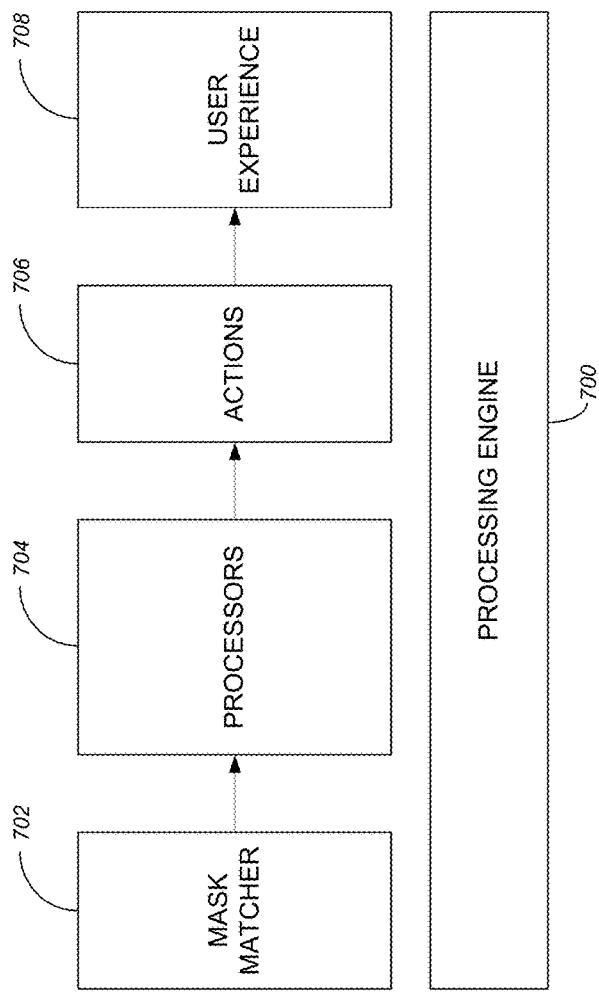
FIG. 7A illustrates the auto-tagging process and the breakdown of the auto-tag processing components in accordance with one or more embodiments of the invention.

FIG. 7A illustrates the auto-tagging process and the breakdown of the auto-tag processing components in accordance with one or more embodiments of the invention. A processing engine 700 orchestrates the sequence of events conducted as part of the auto-tagging process. The mask matcher 702 identifies the file structure. If a mask is identified for a particular file structure part, the mask matcher 702 will find the appropriate mask. The mask matcher 702 functionality is performed automatically and may utilize a search functionality (if enabled based on the user's permissions). If a match is found, the file is processed. Processors 704 provide the individual process logic for the various file structure components (e.g., versed ID, audio channel processing, etc.). The actions 706 are the actions performed by the processors 704 to apply values to fields (i.e., the metadata tagging). The user experience 708 provides notification and the user interface experience (e.g., auditing capability).

FIG. 7B illustrates a summary of the auto-tagging feature workflow in accordance with one or more embodiments of the invention.

At step 710 (a required step), a file is placed in a vendor's hot folder and an Esprit asset ID is created, allowing DAD to view the asset's filename.

At step 712 (an automated step), the automated tagging process commences wherein DAD reads the filename from Esprit and auto-tags the asset. An exemplary filename is:

2HowToTrainYourDragon2_132049_099_1080i50_
LAS4_VAM_000 311_V291257_240_IntlMore
(SPND)_LASDub_BC851630.mxf At optional step 714, the user is able to audit the asset to see what processed behind the scenes and to troubleshoot the filename if issues occur.

FIG. 7C illustrates the different parts of the filename 716, the corresponding processor 704 that is invoked based thereon, the action 706 performed by the processor in an exemplary processing of the filename (i.e., the action indicates what metadata tag was provided and whether the processor executed properly), and an info button 718 that a user may hover over to view the actual results/values assigned by the autotagging process (i.e., the auditing functionality).

In the example of FIG. 7C, there are ten (10) parts to a structured filename. Part 0 is the broadcast specification that corresponds to a matchlist processor that provides broadcast specification metadata tags.

Part 1 is the WPR (World Product Registry) number that corresponds to a WPR # processor. The WPR # processor provides the title, WPR ID, and asset type metadata tags.

Part 2 is the master control number (MCN) or version number that is processed by the Version ID processor to provide the version ID, WPR ID, title, and asset type metadata tags.

Part 3 is the audio language that is processed using the Audio processor to provide the conformed language, audio channel 1 language, audio channel 2 language, and audio channel present metadata tags.

Part 4 is the description that is processed using the BQ Video Description processor.

Part 5 is the TRT (Total Runtime) processed by the Runtime processor to provide the total runtime metadata tag.

Part 6 is the DAR (Display Aspect Ratio) that is processed by the Display Aspect Ratio (DAR) processor to provide the video aspect ratio and aperture metadata tags.

Part 7 is the source that is processed by the Matchlist processor to provide the Master Version (which overrode the existing value in the example provided).

Parts 8 and 9 are the show title and Set number which are ignored.

FIGS. 8 and 9 illustrate a close up view of the results of auto tagging performed on a filename above in accordance with one or more embodiments of the invention. In the example, all but one required field was completed and several audio channels were also competed (FIG. 9). Further, a template (e.g., TVD BQ Video) was utilized to further tag the asset based on various parameters. In this regard, a selected (e.g., automatically selected or manually selected by the user) global preset and/or template may be used to populate fields. Further, the automatic tagging may be applied through the constraints of a template. FIGS. 8 and 9 may be displayed to allow the user to edit/add any of the desired fields prior to actually assigning the metadata tags to the asset. In another scenario, the assigned Global Preset could drive more required fields and/or lock fields based on the configuration of the Global Preset.

In another exemplary use case for a broadcast quality video naming convention, the file name may consist of the following:

SHOW_WPR#_SET#_SPEC_AUDIO_SOURCE_TRT_
M\V_DAR_DESC.EXT where the underscores separate each "part" of the filename. Below is an example of an actual filename that conforms to the above naming convention:

PrisonBreak_4AKJ01_099_PAL16×
9i_ENG2_INT_004215_V183549_235_Subtitled.mxf

Accordingly, the show is "PrisonBreak", the WPR # is 4AKJ01, the Set # is 099, the Specification is PAL16×9i (i.e., Phase Alternating Line, 16×9 aspect ratio, interlaced), the Audio is English 2, the Source is INT, the total running time (TRT is 004215 (e.g., 0 hours, 42 minutes, and 15 seconds), the M\V is V183549, the DAR (digital audience rating) is 235, and the video description is subtitled. Once the parts are identified by the mask matcher 702, each processor 704 will evaluate each part of the filename and calculate the metadata that will be applied to the asset. Every processor 704 will then call an action 706 to apply the metadata to the asset. Lastly, the user experience 708 (e.g., user interfaces, notification and reporting) may provide additional capability (e.g., auditing) to the user.

In an additional exemplary use case for a broadcast quality audio naming convention, the file name may consist of the following:

SHOW_WPR#_SET#_VEL_BD_SR_LANG_CHAN_
 SOURCE_M\V_DESC.EXT

Two exemplary file names that conforms to the audio naming convention are:

PrisonBreak_4AKJ01_099_25_16_48_ENG_Center_
 INT_M189349.wav; and
Glee_1ARC79_099_25_16_48_MnE_Left_INT_
 V155678.wav The shows are PrisonBreak and Glee, the WPR#s are 4AKJ01 and 1ARC79 respectively, the Set #s are 099, the VEL is 25, the BD is 16, the SR (sampling rates) are 48 (kHz), the languages are English and Modern English, the channels are center and left, the Source is INT, and the M\Vs or descriptions are M189349 and V155678 respectively.

In addition to the above, the auto-tagging may follow a prioritization in determining which value should apply if there are any conflicting tags. For example, an element of the filename that is processed later may override/trump any earlier determined values. In this regard, logic may be additive and linear such that an action from one processor 704 may be overwritten by a future processor 704 in the orchestration order. However, alternative prioritization techniques may also be utilized in accordance with embodiments of the invention. As an example, a first part of a filename (e.g., processed by a first processor 704) may assign a broadcast specification value of broadcast quality to an asset. However, a later part of the filename (e.g., processed by a second processor 704 and/or the same processor 704) may determine and assign a broadcast specification of HD 10801 25, the later value may override the previously assigned value.

Hardware Environment

Figure 10:
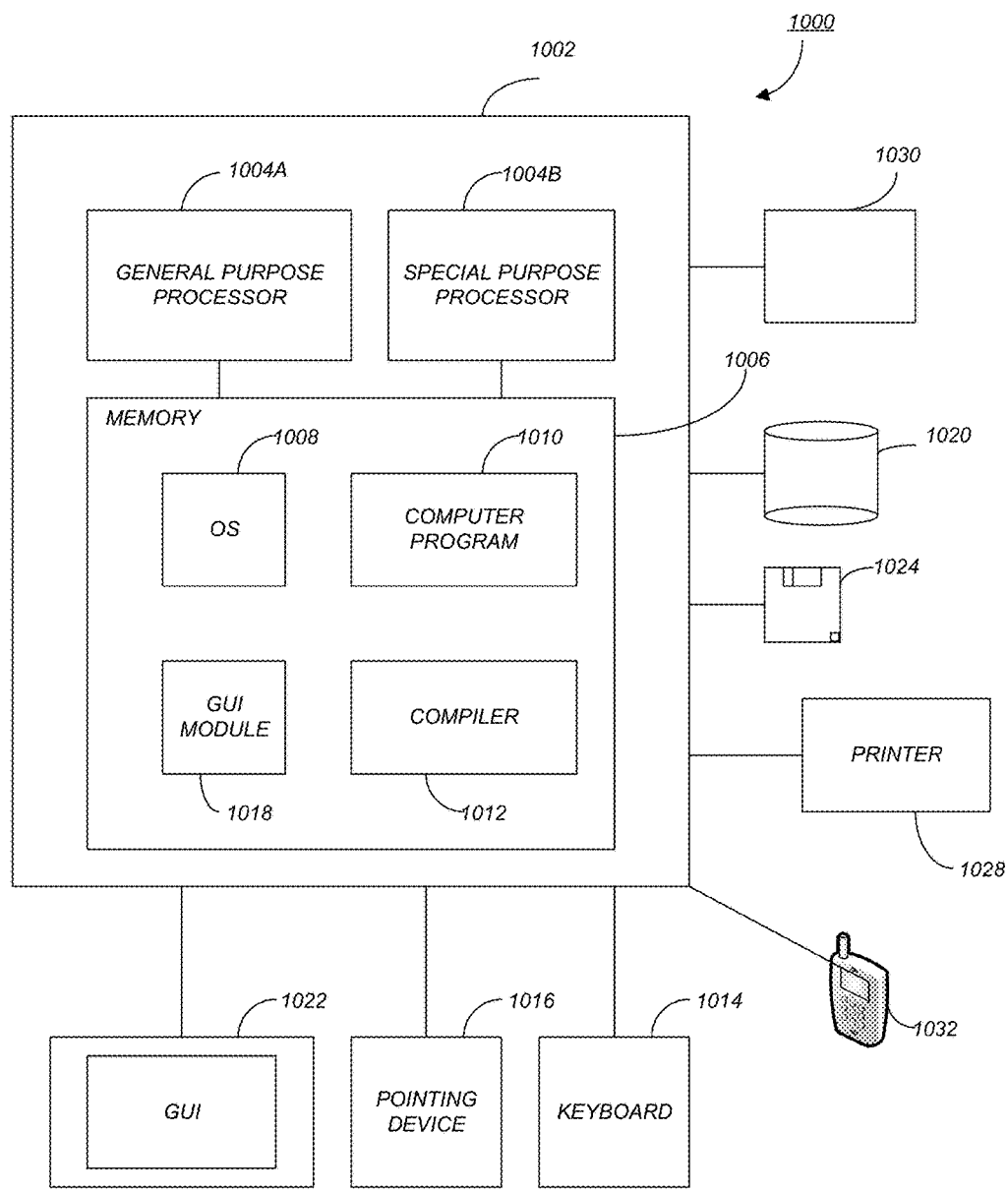
FIG. 10 is an exemplary hardware and software environment used to implement one or more embodiments of the invention.

FIG. 10 is an exemplary hardware and software environment 1000 used to implement one or more embodiments of the invention. The hardware and software environment includes a computer 1002 and may include peripherals. Computer 1002 may be a user/client computer, server computer, or may be a database computer. The computer 1002 comprises a general purpose hardware processor 1004A and/or a special purpose hardware processor 1004B (hereinafter alternatively collectively referred to as processor 1004) and a memory 1006, such as random access memory (RAM). The computer 1002 may be coupled to, and/or integrated with, other devices, including input/output (I/O) devices such as a keyboard 1014, a cursor control device 1016 (e.g., a mouse, a pointing device, pen and tablet, touch screen, multi-touch device, etc.) and a printer 1028. In one or more embodiments, computer 1002 may be coupled to, or may comprise, a portable or media viewing/listening device 1032 (e.g., an MP3 player, iPod™, Nook™, portable digital video player, cellular device, personal digital assistant, etc.). In yet another embodiment, the computer 1002 may comprise a multi-touch device, mobile phone, gaming system, internet enabled television, television set top box, or other internet enabled device executing on various platforms and operating systems.

In one embodiment, the computer 1002 operates by the general purpose processor 1004A performing instructions defined by the computer program 1010 under control of an operating system 1008. The computer program 1010 and/or the operating system 1008 may be stored in the memory 1006 and may interface with the user and/or other devices to accept input and commands and, based on such input and commands and the instructions defined by the computer program 1010 and operating system 1008, to provide output and results.

Output/results may be presented on the display 1022 or provided to another device for presentation or further processing or action. In one embodiment, the display 1022 comprises a liquid crystal display (LCD) having a plurality of separately addressable liquid crystals. Alternatively, the display 1022 may comprise a light emitting diode (LED) display having clusters of red, green and blue diodes driven together to form full-color pixels. Each liquid crystal or pixel of the display 1022 changes to an opaque or translucent state to form a part of the image on the display in response to the data or information generated by the processor 1004 from the application of the instructions of the computer program 1010 and/or operating system 1008 to the input and commands. The image may be provided through a graphical user interface (GUI) module 1018. Although the GUI module 1018 is depicted as a separate module, the instructions performing the GUI functions can be resident or distributed in the operating system 1008, the computer program 1010, or implemented with special purpose memory and processors.

In one or more embodiments, the display 1022 is integrated with/into the computer 1002 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 1002 according to the computer program 1010 instructions may be implemented in a special purpose processor 1004B. In this embodiment, the some or all of the computer program 1010 instructions may be implemented via firmware instructions stored in a read only memory (ROM), a programmable read only memory (PROM) or flash memory within the special purpose processor 1004B or in memory 1006. The special purpose processor 1004B may also be hardwired through circuit design to perform some or all of the operations to implement the present invention. Further, the special purpose processor 1004B may be a hybrid processor, which includes dedicated circuitry for performing a subset of functions, and other circuits for performing more general functions such as responding to computer program 1010 instructions. In one embodiment, the special purpose processor 1004B is an application specific integrated circuit (ASIC).

The computer 1002 may also implement a compiler 1012 that allows an application or computer program 1010 written in a programming language such as COBOL, Pascal, C++, FORTRAN, or other language to be translated into processor 1004 readable code. Alternatively, the compiler 1012 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 1010 accesses and manipulates data accepted from I/O devices and stored in the memory 1006 of the computer 1002 using the relationships and logic that were generated using the compiler 1012.

The computer 1002 also optionally comprises an external communication device such as a modem, satellite link, Ethernet card, or other device for accepting input from, and providing output to, other computers 1002.

In one embodiment, instructions implementing the operating system 1008, the computer program 1010, and the compiler 1012 are tangibly embodied in a non-transitory computer-readable medium, e.g., data storage device 1020, which could include one or more fixed or removable data storage devices, such as a zip drive, floppy disc drive 1024, hard drive, CD-ROM drive, tape drive, etc. Further, the operating system 1008 and the computer program 1010 are comprised of computer program 1010 instructions which, when accessed, read and executed by the computer 1002, cause the computer 1002 to perform the steps necessary to implement and/or use the present invention or to load the program of instructions into a memory 1006, thus creating a special purpose data structure causing the computer 1002 to operate as a specially programmed computer executing the method steps described herein. Computer program 1010 and/or operating instructions may also be tangibly embodied in memory 1006 and/or data communications devices 1030, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1002.

Figure 11:
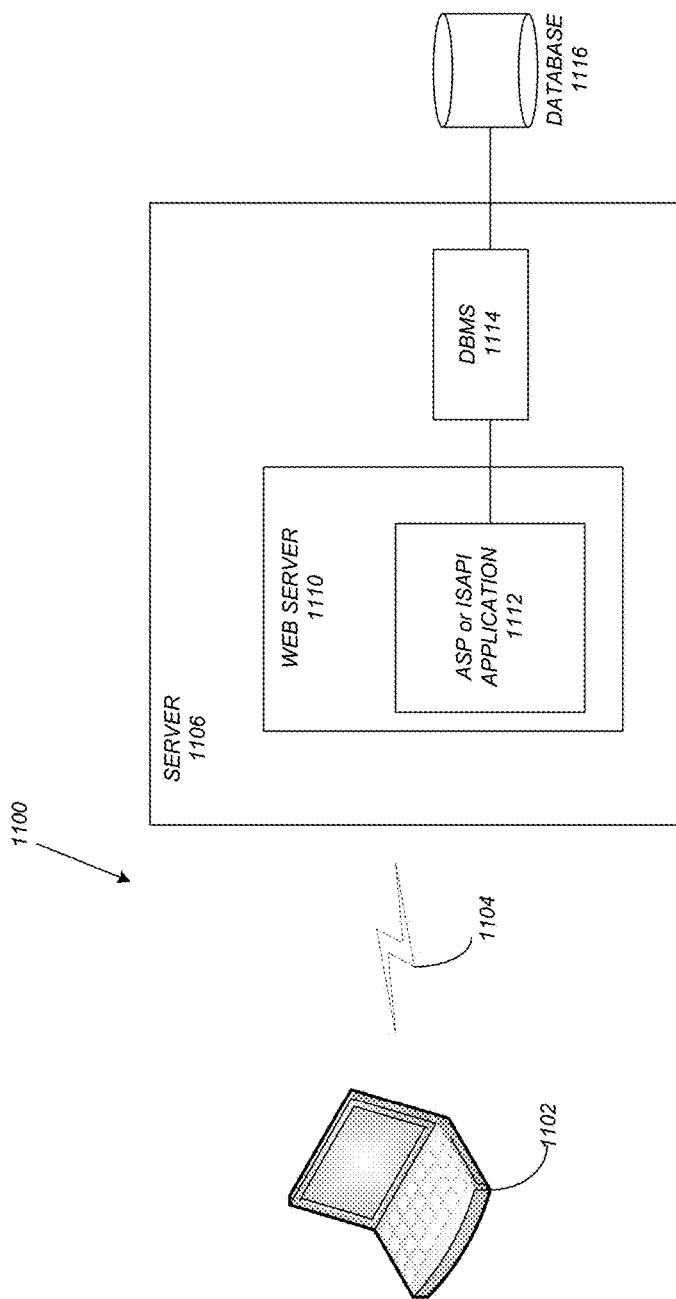
FIG. 11 schematically illustrates a typical distributed computer system using a network to connect client computers to server computers in accordance with one or more embodiments of the invention.

FIG. 11 schematically illustrates a typical distributed computer system 1100 using a network 1104 to connect client computers 1102 to server computers 1106. A typical combination of resources may include a network 1104 comprising the Internet, LANs (local area networks), WANs (wide area networks), SNA (systems network architecture) networks, or the like, clients 1102 that are personal computers or workstations (as set forth in FIG. 10), and servers 1106 that are personal computers, workstations, minicomputers, or mainframes (as set forth in FIG. 10). However, it may be noted that different networks such as a cellular network (e.g., GSM [global system for mobile communications] or otherwise), a satellite based network, or any other type of network may be used to connect clients 1102 and servers 1106 in accordance with embodiments of the invention.

A network 1104 such as the Internet connects clients 1102 to server computers 1106. Network 1104 may utilize ethernet, coaxial cable, wireless communications, radio frequency (RF), etc. to connect and provide the communication between clients 1102 and servers 1106. Clients 1102 may execute a client application or web browser and communicate with server computers 1106 executing web servers 1110. Such a web browser is typically a program such as MICROSOFT INTERNET EXPLORER™, MOZILLA FIREFOX™ OPERA™, APPLE SAFARI™, GOOGLE CHROME™, etc. Further, the software executing on clients 1102 may be downloaded from server computer 1106 to client computers 1102 and installed as a plug-in or ACTIVEX™ control of a web browser. Accordingly, clients 1102 may utilize ACTIVEX™ components/component object model (COM) or distributed COM (DCOM) components to provide a user interface on a display of client 1102. The web server 1110 is typically a program such as MICROSOFT'S INTERNET INFORMATION SERVER™.

Web server 1110 may host an Active Server Page (ASP) or Internet Server Application Programming Interface (ISAPI) application 1112, which may be executing scripts. The scripts invoke objects that execute business logic (referred to as business objects). The business objects then manipulate data in database 1116 through a database management system (DBMS) 1114. Alternatively, database 1116 may be part of, or connected directly to, client 1102 instead of communicating/obtaining the information from database 1116 across network 1104. When a developer encapsulates the business functionality into objects, the system may be referred to as a component object model (COM) system. Accordingly, the scripts executing on web server 1110 (and/or application 1112) invoke COM objects that implement the business logic. Further, server 1106 may utilize MICROSOFT'S™ Transaction Server (MTS) to access required data stored in database 1116 via an interface such as ADO (Active Data Objects), OLE DB (Object Linking and Embedding DataBase), or ODBC (Open DataBase Connectivity).

Generally, these components 1100-1116 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1102 and 1106 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1102 and 1106.

Logical Flow

Figure 12:
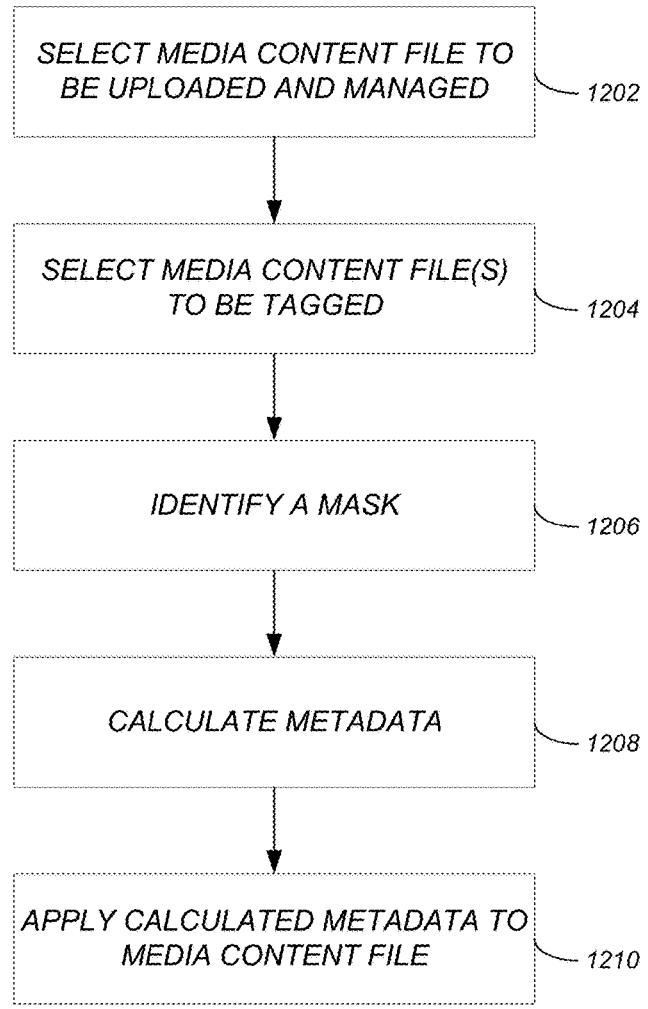
FIG. 12 illustrates the logical flow for ingesting a media content file in accordance with one or more embodiments of the invention.

FIG. 12 illustrates the logical flow for ingesting a media content file in accordance with one or more embodiments of the invention.

At step 1202, a media content file to be uploaded and managed (in an enterprise media framework (EMF)) is selected.

At step 1204, media content file(s) to be tagged are selected.

At step 1206, a mask matcher is used to identify a mask. The mask identifies a file structure of information associated with the media content file. Further, the mask identifies/has multiple parts. The information associated with the media content file may be a name of the media content file. In such an embodiment, the name of the media content file may be matched to a mask template. Such a mask template identifies the file structure via a naming convention based on the name of the media content file.

At step 1208, for each of the multiple parts and based on the information associated with the media content file, metadata that will be applied to the media content file is calculated. Step 1208 may include performing a function that transforms the part into metadata. For example, if provided an MCN (master control number) within a filename, an external service may be called that looks up a version number based on the MCN, while also performing a conflict check between the version number and MCN. In this regard, the functions that are performed to calculate the metadata consist of more than a mere transcription of text from a filename. Instead, the functions may manipulate, look up, etc. the metadata using external applications/services, where the metadata is computed based on the filename or other information.

Step 1208 may also include an auditing/editing/modifying of the calculated metadata. For example, a graphical user interface metadata auditing screen may be displayed. Such a screen may include multiple fields and the calculated metadata for each of the multiple fields. The user can then use the graphical user interface to modify the calculated metadata.

At step 1210, for each of the multiple parts, the calculated metadata is automatically applied to (all of) the media content file. A separate processor may calculate the metadata for each of the multiple parts (i.e., in step 1208). Thereafter, each separate processor may call an action that automatically applies the calculated metadata to the media content file. In addition, a set of the calculated metadata may be stored in a preset and then applied to one or more selected media content files.

Steps 1208 and 120 may be performed for each of the multiple parts sequentially in an additive and linear manner based on a sequence of the multiple parts in the name of the media content file (or other sequential/order that may be derived from the media content file).

After applying the calculated metadata, step 1210 may also include the logging and reporting a status of the automatically applying. Thereafter, when conducting a search for media content assets/files, the metadata tags enable an expedited and more accurate search. In this regard, media assets may be quickly and accurately identified and used (e.g., downloaded, transmitted, processed, etc.).

Further to the above, steps 1202-1210 may allow/enable real-time tagging before a media content file has completed uploading into the EMF system. In this regard, step 1202 may include the step of placing the media content file into a "hot folder". In response thereto, an asset identification (that identifies the media content file) is created in a database repository (e.g., Esprit™) of the EMF. Based on the asset identification creation, a tagging application may be initiated. The tagging application enables performance of the identifying 1206, calculating 1208 and automatically applying 1210 steps prior to completion of an uploading of the media content file.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for ingesting a media content file, comprising:
   selecting, in a computer, the media content file to be uploaded and managed in an enterprise media framework (EMF);
   selecting the media content file for tagging;
   placing the media content file in a hot folder;
   in response to the placing, creating an asset identification in the database repository of the EMF, wherein the asset identification identifies the media content file;
   based on the asset identification creation, initiating a tagging application;
   identifying, in a mask matcher, a mask that identifies a file structure of information associated with the media content file, wherein the mask comprises multiple parts;
   for each of the multiple parts and based on the information associated with the media content file, calculating metadata that will be applied to the media content file, wherein the metadata comprises title information, asset information, video attribute information and audio attribute information for the media content file;
   for each of the multiple parts, automatically applying the calculated metadata to the media content file; and
   uploading the media content file and the applied calculated metadata to a database repository of the EMF, wherein the EMF conducts a search of the database repository for media content files based on the applied calculated metadata, wherein the tagging application enables performance of the identifying, calculating and automatically applying steps prior to completion of the uploading of the media content file.

2. The computer-implemented method of claim 1, wherein:
   the information associated with the media content file comprises a name of the media content file; and
   the identifying the mask comprises matching the name of the media content file to a mask template, wherein the mask template identifies the file structure via a naming convention based on the name of the media content file.

3. The computer-implemented method of claim 2, wherein:
   the calculating and automatically applying are performed for each of the multiple parts sequentially in an additive and linear manner based on a sequence of the multiple parts in the name of the media content file.

4. The computer-implemented method of claim 1, wherein:
   a separate processor calculates the metadata for each of the multiple parts; and each separate processor calls an action that automatically applies the calculated metadata to the media content file.

5. The computer-implemented method of claim 1, wherein the calculating metadata comprises:
performing a function that transforms the part into metadata.

6. The computer-implemented method of claim 1, further comprising:
logging and reporting a status of the automatically applying.

7. The computer-implemented method of claim 1, wherein:
the selecting the media content file for tagging comprises selecting multiple media content files for tagging; and
the automatically applying the calculated metadata applies the calculated metadata to all of the selected media content files.

8. The computer-implemented method of claim 1, further comprising:
storing a set of metadata in a preset; and
applying the preset to the selected media content file.

9. The computer-implemented method of claim 1, wherein the calculating further comprises:
displaying a graphical user interface metadata auditing screen comprising multiple fields and the calculated metadata for each of the multiple fields; and
modifying, via the graphical user interface metadata auditing screen, the calculated metadata for one or more of the multiple fields.

10. An system for ingesting a media content file comprising:
(a) a computer having a memory;
(b) a enterprise media framework (EMF) executing on the computer, wherein the EMF is configured to manage media content;
(c) a digital asset dock (DAD) executing on the computer, wherein the DAD is configured to deliver and ingest the media content into the EMF;
(d) a graphical user interface (GUI) application of the DAD executing on the computer to:
(1) select the media content file to be uploaded and managed in the EMF;
(2) select the media content file for tagging;
(3) place the media content file in a hot folder, wherein, in response to the placing, the DAD creates an asset identification in the database repository of the EMF, wherein the asset identification identifies the media content file, and wherein, based on the asset identification creation, a tagging application is initiated;
(e) the tagging application, executing within the DAD, wherein the tagging application enables a mask matcher application, one or more processor applications, and one or more actions to perform an identifying, a calculating, and an automatically applying prior to completion of an uploading of the media content file;
(ef) the mask matcher application executing within the DAD, wherein the mask matcher application is configured to identify a mask that identifies a file structure of information associated with the media content file, wherein the mask comprises multiple parts;
(g) for each of the multiple parts, the one or more processor applications, executing within the DAD, wherein each of the one or more processor applications calculates, based on the information associated with the media content file, metadata that will be applied to the media content file, wherein the metadata comprises title information, asset information, video attribute information and audio attribute information for the media content file; and
(h) the one or more actions called by each of the multiple parts, wherein each of the one or more actions automatically applies the calculated metadata to the media content file; and
wherein the media content file and the applied calculated metadata are uploaded to a database repository of the EMF, and wherein the EMF conducts a search of the database repository for media content files based on the applied calculated metadata.

11. The system of claim 10, wherein:
the information associated with the media content file comprises a name of the media content file; and
the identifying the mask comprises matching the name of the media content file to a mask template, wherein the mask template identifies the file structure via a naming convention based on the name of the media content file.

12. The system of claim 11, wherein:
the calculating and automatically applying are performed for each of the multiple parts sequentially in an additive and linear manner based on a sequence of the multiple parts in the name of the media content file.

13. The system of claim 10, wherein one or more of the one or more processor applications calculates the metadata by:
performing a function that transforms the part into metadata.

14. The system of claim 10, further comprising:
a user experience module, executing within the DAD, configured to log and report a status of the one or more actions.

15. The system of claim 10, wherein:
the mask matcher application selects the media content file for tagging by selecting multiple media content files for tagging; and
the one or more actions automatically apply the calculated metadata to all of the selected media content files.

16. The system of claim 10, wherein:
one or more of the processor applications are further configured to store a set of metadata in a preset; and
one or more of the actions are configured to apply the preset to the selected media content file.

17. The system of claim 10, wherein the one or more processor applications are further configured to:
display a graphical user interface metadata auditing screen comprising multiple fields and the calculated metadata for each of the multiple fields; and
modify, via the graphical user interface metadata auditing screen, the calculated metadata for one or more of the multiple fields.

18. The computer-implemented method of claim 1, wherein the metadata comprises title information, season information, episode information, division information, department information, territory information, and asset type information.

* * * * *